INVENTORS
JOHN BREWER BECK &
BY ROLAND N. RHODES
W. H. Spouagle
Attorney

Nov. 22, 1966 R. N. RHODES ET AL 3,287,596

SINGLE TUBE VERTICAL DEFLECTION CIRCUIT
FOR A TELEVISION RECEIVER

Filed Feb. 20, 1964 2 Sheets-Sheet 2

INVENTORS
JOHN BREWER BECK &
BY ROLAND N. RHODES
W. H. Sprague
Attorney

United States Patent Office 3,287,596
Patented Nov. 22, 1966

3,287,596

SINGLE TUBE VERTICAL DEFLECTION CIRCUIT FOR A TELEVISION RECEIVER

Roland N. Rhodes and John B. Beck, Indianapolis, Ind., assignors to Radio Corporation of America, a corporation of Delaware

Filed Feb. 20, 1964, Ser. No. 346,321
9 Claims. (Cl. 315—27)

Figure 1:
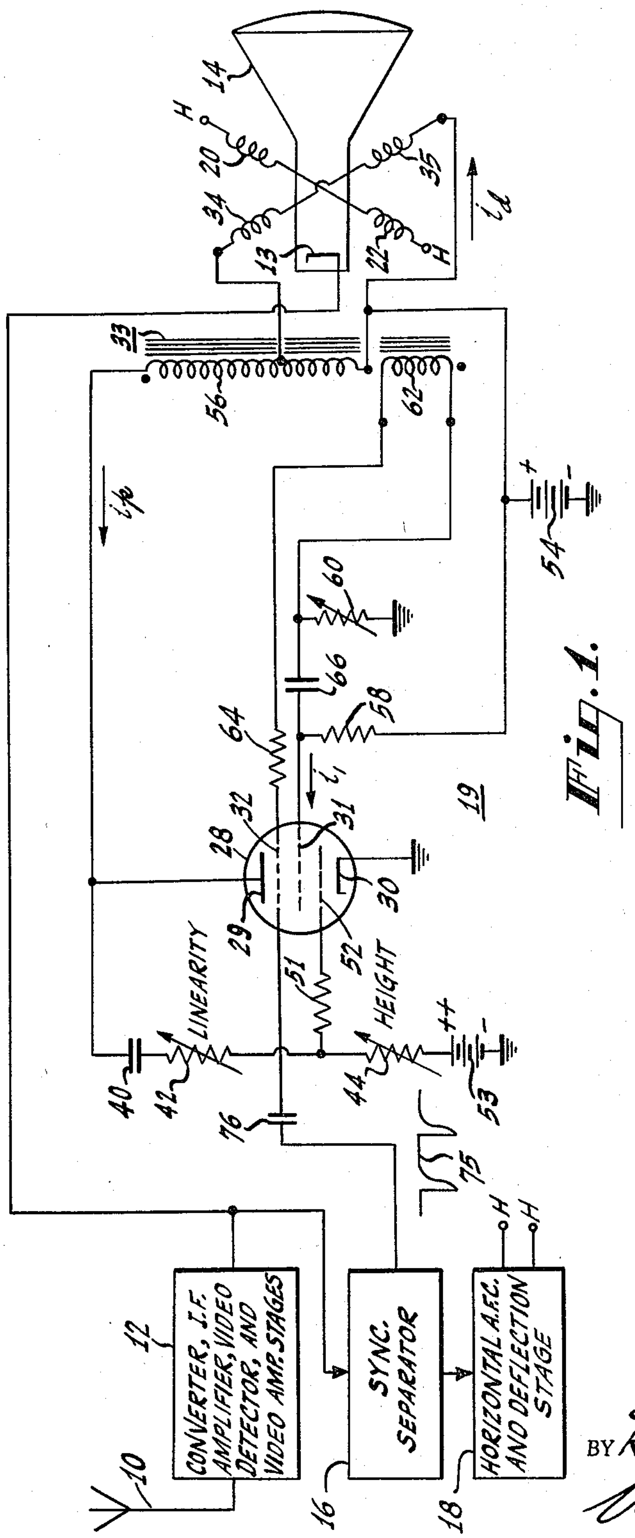

This invention relates to a circuit arrangement having a single electron discharge device for providing electromagnetic deflection of an electron beam in the cathode ray tube of a television receiver. The invention relates more particularly to an improvement in a circuit arrangement of this type.

A form of deflection circuit arrangement for use in a vertical deflection stage of a television receiver employs a single, multi-electrode, electron discharge amplifying device which functions both as a waveform generator and as an output amplifier. A deflection winding is transformer coupled to the device and the circuit is adapted to oscillate and generate a current of sawtooth waveform in the winding. Circuit means are coupled to electrodes of the device for causing the circuit to oscillate at a desired frequency. The circuit means include means for generating a voltage in accordance with a current ($i_1$) flowing to a first electrode which is spaced intermediate the anode and cathode electrodes of the device, and for applying this voltage to a second intermediate electrode. For example, in a form of this circuit arrangement utilizing a pentode, a negative-going voltage is generated at the screen electrode during a trace interval of a deflection cycle and is coupled to a suppressor electrode. A decreasing voltage at the suppressor reduces anode current and initiates the generation of a retrace segment of the sawtooth current waveform.

The current ($i_1$) flowing to the first intermediate electrode has a generally sawtooth waveform which includes trace and retrace segments. The voltage at the second intermediate electrode varies continuously during the trace interval in accordance with the trace segment of the current ($i_1$). In some electron discharge devices, as for example the pentode, greater power output and a corresponding greater deflection capability is realized when the second intermediate electrode is maintained at an established direct current potential. Although the voltage at the second intermediate electrode of the single tube deflection circuit varies during the retrace interval, it is advantageous, for purposes of circuit efficiency as indicated, to maintain the voltage at this electrode at a relatively more uniform and more positive value during the trace interval than has heretofore been provided.

Accordingly, it is an object of the present invention to provide a single tube deflection circuit of the type referred to having circuit means for establishing a more uniform and more positive voltage at the second intermediate electrode during the trace interval of the deflection cycle.

Television receivers generally include adjustable circuit means in the vertical deflection stage for varying the rate of vertical deflection. For viewer convenience and in order to avoid multiple adjustments to the raster, it is desirable to vary the frequency of deflection without substantially interfering with other characteristics of the raster such as height and vertical linearity. In a deflection circuit having a single electron discharge device, it is relatively difficult to attain this result in view of the small degree of isolation which can be provided between elements in this circuit arrangement.

It is another object of the present invention to provide a single tube deflection circuit of the type referred to having improved circuit means for adjusting the frequency of oscillation without substantially interfering with other characteristics of the raster.

Operation of the single tube deflection circuit is improved when the voltage which is coupled to the second intermediate electrode is of relatively large amplitude. During the retrace interval, anode current is caused to decrease sharply and the inductance in the anode circuit causes anode voltage to increase rapidly to a relatively large value. The large voltage amplitude at the second intermediate electrode is desirable for turning off the anode current during the retrace interval. Concurrent circuit operating requirements often restrict the voltage amplitude variation which can be provided at the first intermediate electrode and in some instances this amplitude is insufficient for providing desired control of the anode current under the influence of the increased anode voltage.

An alternative circuit arrangement utilizes an electron discharge device having a second intermediate electrode with a relatively high transconductance. The increased transconductance avoids the need for providing a voltage of a relatively large amplitude at the second intermediate electrode. In providing the increased transconductance, however, the number of turns in the structure of the second electrode is increased and the power handling capability of the device is disadvantageously reduced.

Another object of this invention is to provide an improved circuit arrangement which is adapted to control the frequency of operation of the deflection circuit, to provide a relatively uniform voltage at the second intermediate electrode and to apply a voltage of relatively large amplitude to a second intermediate electrode of an electron discharge device of the circuit during a retrace interval of a waveform being generated.

In accordance with the present invention, an electromagnetic deflection circuit arrangement is provided and includes means for generating a first voltage ($e_1$) having a waveform including a trace segment which varies in accordance with the amplitude of current flow to a first intermediate electrode of the device; for generating a second voltage ($e_2$) having a waveform which includes a trace segment of a somewhat similar configuration but of opposite polarity to the trace segment of the first voltage ($e_1$); and for combining and applying these voltages to a second intermediate electrode. During the trace interval, these voltages combine to form at the second intermediate electrode a resultant voltage having a relatively uniform amplitude.

For initiating retrace, the voltage ($e_1$) must exceed the voltage ($e_2$) at the termination of the trace interval. Adjustable impedance means are provided for varying the relative amplitude of these voltages to thereby regulate that time during the cycle at which ($e_1$) exceeds ($e_2$). Thus, a means is provided for controlling the initiation of retrace and consequently the frequency of deflection.

The circuit is arranged for providing that the waveform of the second voltage ($e_2$) includes a pulse segment occurring during a retrace interval of the waveform. This segment has an amplitude and a polarity adapted to control anode current during occurrence of increased anode voltage. Thus, by this circuit arrangement the deflection capability of the circuit is improved, anode current turn-off is enhanced, and a frequency control which can be varied without substantially interfering with raster linearity or height is provided.

Figure 2:
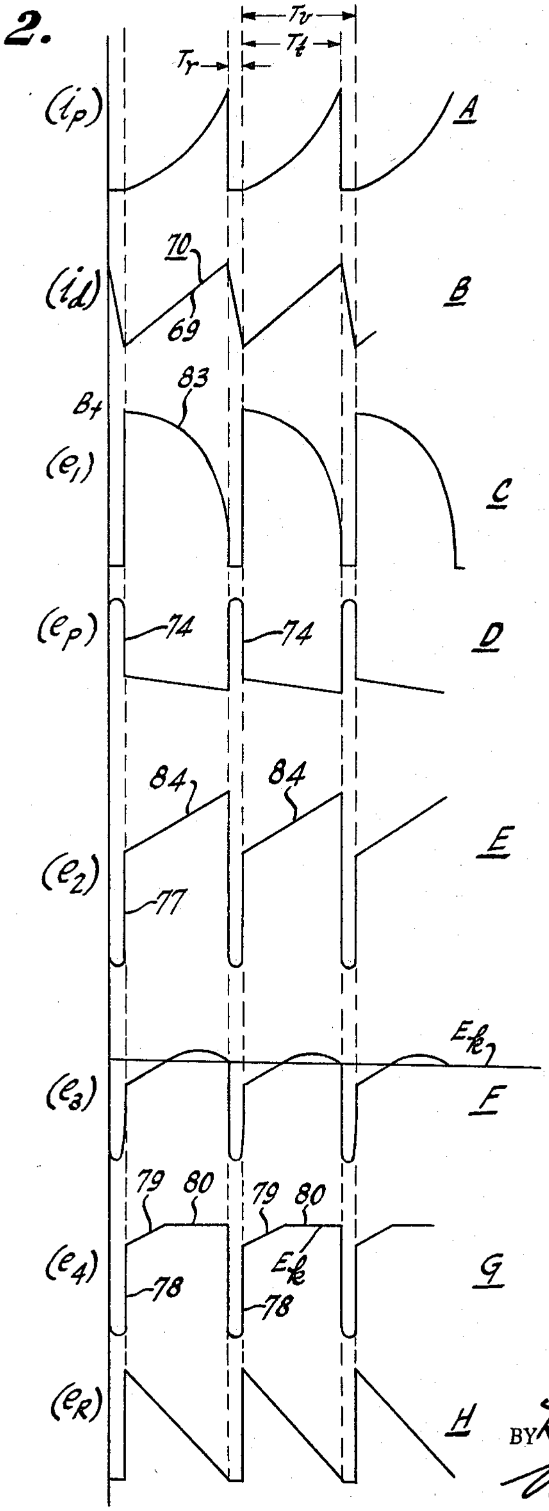

Further objects, features and the attending advantages of this invention will be apparent with reference to the following specification and drawings, in which:

FIGURE 1 is a diagram, partly in block form, of a one-tube vertical deflection circuit of a television receiver illustrating an embodiment of the present invention; and FIGURE 2 is a diagram illustrating various voltage and current waveforms existing at different points in the diagram of FIGURE 1.

For an explanation of the operation of the vertical deflection circuit arrangement and its use in a television receiver, reference is now made to FIGURE 1. In simplifying the description, only those stages of a television receiver are illustrated in FIGURE 1 as are believed necessary for a complete understanding of the invention. A signal voltage having a composite video modulation component is induced in an antenna 10, converted to an intermediate frequency, and amplified. The video modulation component is then detected and amplified. Stages for performing these operations are conventional and are represented by the block 12. The amplified video signal is coupled to a beam controlling electrode 13, of a picture tube 14 of the television receiver for intensity modulating an electron beam. The composite video signal, which includes synchronizing components, is also coupled to a conventional synchronizing signal separator stage 16. Horizontal and vertical synchronizing voltages are derived from the synchronizing components in this stage and are coupled to a horizontal stage 18 and a vertical deflection stage, indicated generally as 19. The horizontal deflection stage 18 generates a sawtooth current in horizontal deflection coils 20 and 22 causing the electron beam of the picture tube 14 to be electromagnetically deflected.

The vertical deflection stage 19, is of the type employing a single, multi-electrode, electron discharge amplifying device which functions both as a waveform generator and as an output amplifier. While other suitable multi-electrode devices may be utilized, the device 28 of FIGURE 1 is shown to be a pentode. The device 28 includes anode and cathode electrodes 29 and 30 respectively and first and second electrodes, 31 and 32 respectively which are spaced intermediate the anode and cathode electrodes in the device. The first and second intermediate electrodes 31 and 32 are respectively the screen and suppressor electrodes in the pentode shown. An output transformer 33 is provided for coupling vertical electron beam deflection windings 34 and 35 to the anode electrode 29 and to the cathode electrode 30. The circuit arrangement is adapted to be oscillatory and for causing oscillations, a circuit means comprising an RC discharge circuit including a capacitor 40 and resistors 42 and 44 is provided as well as circuit means coupled between electrodes 31 and 32. These latter circuit means are discussed more fully hereinafter. The resistors 42 and 44 are adjustable and provide respectively for adjustment of vertical linearity and height of a raster being produced. A resistor 51 serves to limit the amplitude of current flow in a control electode 52. For improving linearity, the resistor 44 is returned to a boost voltage B++ which is represented by a source 53. Direct current B+ operating potential is provided for the device by a source 54 and is applied to the anode electrode 29 via a winding 56 of the transformer 33 and to the screen electrode 31 by a resistor 58. The suppressor electrode 32 is coupled to ground potential by a resistor 64, a winding 62 of the transformer 33 and a resistor 60. A capacitor 66 is provided for coupling voltage alternations at the screen 31 to the suppressor electrode 32.

Referring now to FIGURES 1 and 2, the general operation of the vertical deflection circuit arrangement may be explained as follows: during a trace interval, ($T_t$) of a vertical deflection cycle having a period ($T_v$), the capacitor 40 which was discharged during a prior retrace interval ($T_r$) charges through resistors 42 and 44 toward the B-boost voltage. A charging voltage waveform existing at the junction of resistors 42 and 44 is coupled to the control electrode 52 by the resistor 51. This voltage causes anode elecrode current ($i_p$), which flows in the transformer winding 56, to increase parabolically, as illustrated in FIGURE 2A. As a result, a trace segment 69 of a sawtooth deflection waveform 70, illustrated in FIGURE 2B, flows in the deflection windings 34 and 35. An electromagnetic field is therefore generated for deflecting the electron beam in a vertical direction across a viewing face of the picture tube 14. The duration of the trace interval is primarily determined by the time constant of the R–C charge circuit. A current ($i_1$) in the screen electrode varies in a manner similar to the anode current ($i_p$) and a voltage ($e_1$) at the screen electrode 31 decreases with a generally parabolic waveform, as indicated in FIGURE 2C. As described in more detail hereinafter, circuit means combine the decreasing screen voltage with a second voltage ($e_2$) (FIG. 2E) and apply a resultant voltage to the suppressor electrode 32. When the voltage at the suppressor electrode becomes negative with respect to the cathode electrode, then electrons are returned to the screen electrode 31. These electrons increase the current ($i_1$) and cause the voltage ($e_1$) to become more negative. A regenerative action is initiated whereby the suppressor electrode voltage is rapidly driven further negative and current to the anode 29 is reduced to cutoff.

Because of the inductance including the winding 56 of the transformer 33 and the deflection windings 34 and 35 which are coupled to the anode 29, a large positive voltage pulse 74, illustrated in FIGURE 2D, is generated at the anode electrode when the anode current is rapidly cut off. The amplitude of the various voltages and currents of FIGURE 2 are not to scale and FIGURE 2 illustrates the waveforms and relative timing of the voltages and currents occurring in the circuit. The duration of the pulse 74 is primarily determined by the characteristics of the transformer 33. This pulse causes the control electrode 52 to become positive with respect to the cathode 30 and the capacitor 40 discharges through the resistor 42, the resistor 51, and the control electrode-to-cathode circuit of the device 28. During the discharge period, a negative voltage is developed at the control electrode 52. At the termination of the retrace interval, the capacitor 40 charges through the resistors 42 and 44 and the trace proceeds once again. The vertical deflection cycle then repeats and oscillations are maintained. A vertical synchronizing voltage 75, illustrated in FIGURE 1, is provided at the output of synchronizing separator stage 16 and is coupled by a capacitor 76 to the suppressor electrode 32. The voltage 75 provides for synchronization of the oscillations in the circuit 19 with other stages of the receiver by causing the suppressor electrode to be driven negative and to initiate retrace.

Circuit means are provided for generating a voltage ($e_1$) (FIGURE 2C) which varies in accordance with the current ($i_1$); for generating a second voltage ($e_2$) (FIGURE 2E) having a waveform including a trace segment of somewhat similar configuration but opposite polarity to a trace segment of the voltage ($e_1$); and for combining and applying these voltages to the suppressor electrode. The waveform of the trace segment of ($e_1$) and ($e_2$) are of similar configuration when the amplitude of each segment progresses in a substantially continuous manner from a first value at the beginning of trace to a second differing value at the termination of trace. The waveform of the trace segment of ($e_1$) and ($e_2$) need not have the same appearance to be of similar configuration. This is illustrated by the parabolic trace segment 83 of ($e_1$), FIGURE 2C and the linear trace segment 84 of ($e_2$), FIGURE 2E. In FIGURE 1, the transformer 33 is shown to include a winding 62. This winding is positioned in the field of the transformer and a voltage ($e_2$), FIGURE 2E having a similar waveform as that of the anode voltage ($e_p$) is generated across the winding. However, the winding is polarized for generating the voltage ($e_2$) as shown in FIGURE 2E which is inverted with respect to the anode voltage ($e_p$).

A conventional by-pass capacitor is eliminated at the screen electrode 31. Thus, the voltage ($e_1$) at the screen electrode, which was discussed hereinbefore, varies in accordance with the screen current ($i_1$). This voltage ($e_1$) is applied to the suppressor electrode through the winding 62. Since the voltages ($e_1$) and ($e_2$) are applied in series to the suppressor electrode, the voltages add and a composite voltage ($e_3$) exists at the junction of the resistor 64 and the winding 62. The waveform of the voltage ($e_3$) and its variation about the cathode voltage $E_k$ is illustrated at FIGURE 2F. A resultant voltage ($e_4$) illustrated at FIGURE 2G is developed at the suppressor electrode.

The circuit is adapted for providing that the amplitudes of the trace segments 83 and 84 of the voltages ($e_1$) and ($e_2$) do not differ greatly. The resistor 58 and winding 62 are arranged to provide this desired relation. Because the trace segments 83 and 84 are of somewhat similar waveform and of opposite polarity, and their amplitudes do not differ greatly, the sum of the voltages is the voltage ($e_3$) having a relatively smaller amplitude variation during the trace interval than ($e_1$) or ($e_2$). Thus, the voltage at the suppressor electrode is maintained relatively more uniform during the trace interval and more positive near the end of this interval and the power efficiency of the device and deflection capability of the circuit is improved over prior arrangements.

Vertical retrace is initiated when the voltage at the suppressor electrode becomes negative with respect to the cathode electrode. Since the voltages ($e_1$) and ($e_2$) are combined and applied to the suppressor electrode, the time during the cycle at which retrace is initiated is a function of the relative amplitudes of the voltages ($e_1$) and ($e_2$). By controlling the relative amplitudes of these voltages, the initiation of retrace and thus the frequency of oscillation can be regulated. In FIGURE 1, an adjustable impedance comprising the adjustable resistor 60 is provided for controlling the frequency of oscillation. The resistor 60 is a component of a voltage divider formed with D.C. blocking capacitor 66. By varying the resistance of the resistor 60, the amplitude of the voltage ($e_1$) is regulated and consequently the frequency of oscillation is controlled. Since this circuit arrangement for controlling frequency is coupled between the first and second intermediate electrodes, substantial isolation exists between the frequency control and the linearity and height controls. The frequency of vertical oscillation can therefore be varied without substantially affecting the linearity and height of the raster.

In addition to attenuating the voltage ($e_1$), the voltage divider comprising resistor 60 and capacitor 66 functions as a differentiating circuit to remove the parabolic component in the trace segment of the voltage ($e_1$). The differentiated waveform which exists across the resistor 60 is illustrated in FIGURE 2H. The voltage ($e_1$) includes a relatively low frequency component represented by the parabolic segment 83 and a relatively high frequency component represented by the relatively steep positive-going step segment occurring during the retrace interval. The time constant of resistor 60 and capacitance is adapted for differentiating the trace segment of the waveform of ($e_1$) and causing the low frequency component to be altered while the high frequency component remains substantially unaffected. It is advantageous to differentiate the trace segment while leaving the high frequency component substantially unaffected since variations in the later component can affect the pulse component 74 of the voltage ($e_p$) (FIGURE 2D) at the anode and hence the linearity of deflection.

During the retrace interval, a pulse 77 of relatively large negative amplitude is generated across the winding 62 and forms a segment of the waveform of the voltage ($e_2$) (FIGURE 2E). This pulse, which occurs coincidentally in time with the pulse 74 of the voltage ($e_p$) (FIGURE 2D) at the anode electrode, is applied to the suppressor electrode 32. The pulse 77 therefore provides for maintaining the anode current cutoff when the device 28 is under the influence of an increased anode voltage due to the pulse 74.

FIGURE 2G illustrates the resultant waveform which exists at the suppressor electrode 32. During the retrace interval ($T_r$), a negative pulse component 78, occurs, as indicated hereinbefore for maintaining anode current cutoff. During an early portion of the trace interval ($T_t$), the circuit is recovering from this pulse 78 while the voltages ($e_1$) and ($e_2$) are combined and a resultant ramp segment 79 occurs at the suppressor. After the circuit recovers, the voltages ($e_1$) and ($e_2$) determine the voltage applied to the suppressor. When the sum of these voltages, i.e., ($e_3$) exceeds the cathode voltage ($E_k$), the suppressor is clamped at the cathode voltage. At a time when ($e_3$) becomes negative with respect to the cathode, regeneration is initiated and the retrace interval is repeated.

Thus, an improved one tube deflection circuit arrangement has been described for increasing circuit efficiency and deflection capability; for providing a frequency control which can be varied substantially, independently of raster linearity and height; and which maintains a decreasing anode current under the influence of increased anode voltage during retrace.

While it will be understood that the value of circuit components of the one-tube generator may vary in order to fit individual requirements, the following circuit parameters have been found to provide satisfactory operation and are included herein only by way of example, as follows:

Electron discharge device 28—Type RCA–17JQ6

Transformer 33—Type ¾" stack vertical output; autotransformer winding; winding 56 having approximately 2,600 turns; winding 62 having approximately 1,300 turns Vertical deflection windings 34 and 35: Toroidal winding, resistance approximately 27 ohm Resistors:
- 42—100K ohm adjustable
- 44—5 meg. ohm adjustable
- 51—27K ohm
- 58—3.3K ohm
- 60—1 meg. ohm adjustable
- 64—47K ohm Capacitors:
- 40—.0047 $\mu f$.
- 66—.01 $\mu f$.

B+ voltage 54—270 volts D.C.

B-boost voltage 53—600 volts D.C.

Frequency of operation—60 c.p.s.

While there has been illustrated, described and pointed out in the annexed claims, certain novel features of the invention, it will be understood that certain variations, omissions, and substitutions in the forms and details of the system illustrated may be made by those skilled in the art without departing from the spirit of the invention and the scope of the claims.

What is claimed is:

1. In a television receiver, a deflection circuit arrangement comprising:

an electron beam deflection winding;

an electron discharge device having anode and cathode electrodes and a plurality of electrodes spaced intermediate said anode and cathode;

means for coupling said deflection winding to said anode and cathode electrodes; and a control circuit coupled to electrodes of said device for causing the deflection circuit to oscillate and to generate a current of periodically recurring sawtooth waveforms in said deflection winding;

said control circuit including means (1) for generating a voltage ($e_1$) in accordance with the flow of current to a first intermediate electrode, (2) means for generating a varying voltage ($e_2$), and (3) means for combining and applying these voltages to a second intermediate electrode.

2. In a television receiver, a deflection circuit arrangement comprising:

an electron beam deflection winding;
an electron discharge device having anode and cathode electrodes and a plurality of electrodes spaced intermediate said anode and cathode;
means for coupling said deflection winding to said anode and cathode electrodes; and
a control circuit coupled to electrodes of said device for causing the deflection circuit to oscillate and to generate a current of periodically recurring sawtooth waveform in said deflection winding,
said control circuit including means (1) for generating a voltage ($e_1$) in accordance with the flow of current to a first intermediate electrode, said voltage ($e_1$) having a waveform including a trace segment, (2) means for generating a voltage ($e_2$) having a waveform including a trace segment of similar form and opposite polarity to the trace segment of the voltage ($e_1$), and (3) means for combining and applying these voltages to a second intermediate electrode.

3. In a television receiver, a deflection circuit arrangement comprising:

an electron beam deflection winding;
an electron discharge device having anode and cathode electrodes and a plurality of electrodes spaced intermediate said anode and cathode;
means for coupling said deflection winding to said anode and cathode electrodes;
a control circuit coupled to electrodes of said device for causing the deflection circuit to oscillate and to generate a current of periodically recurring sawtooth waveform in said winding;
said control circuit including means (1) for generating a voltage ($e_1$) in accordance with the flow of current to a first intermediate electrode, said voltage ($e_1$) having a waveform including a trace segment, (2) means for generating a voltage ($e_2$) having a waveform including a trace segment of similar form and opposite polarity to the trace segment of the voltage ($e_2$), and (3) means for combining and applying these voltages to a second intermediate electrode; and
adjustable impedance means coupled to said control circuit at a point between said first and second intermediate electrodes for varying the relative amplitudes of the voltages ($e_1$) and ($e_2$).

4. In a television receiver, a deflection circuit arrangement comprising:

an electron beam deflection winding;
an electron discharge device having anode and cathode electrodes and a plurality of electrodes spaced intermediate said anode and cathode;
a transformer having a first winding for coupling the deflection winding to said anode and cathode electrodes; and
a control circuit coupled to electrodes of said device for causing the deflection circuit to oscillate and to generate a current of periodically recurring sawtooth waveform in said deflection winding,
said control circuit including means for generating a voltage ($e_1$) in accordance with the flow of current to a first intermediate electrode, said voltage ($e_1$) having a waveform including a trace segment, and means including a second winding on said transformer adapted to generate a voltage ($e_2$) having a waveform including a trace segment of similar configuration and opposite polarity to said trace segment of said voltage ($e_1$), said means for generating the voltage ($e_1$) and said means including the second transformer winding being intercoupled in a manner for combining and applying said voltages ($e_1$) and ($e_2$) to a second intermediate electrode.

5. In a television receiver, a deflection circuit arrangement comprising:

an electron beam deflection winding;
an electron discharge device having anode and cathode electrodes and a plurality of electrodes spaced intermediate said anode and cathode;
a transformer having a first winding adapted for coupling the deflection winding to the anode and cathode electrodes of the device;
circuit means for coupling said deflection winding to said first transformer winding; and
a control circuit coupled to electrodes of said device for causing the deflection circuit to oscillate and to generate a current of periodically recurring sawtooth waveform in said deflection winding,
said control circuit including a resistive impedance connected between a source of direct current operating potential and a first intermediate electrode,
a second transformer winding polarized oppositely to said first transformer winding, and
means coupling said second transformer winding in series with said resistive impedance and a second intermediate electrode.

6. In a television receiver, a deflection circuit arrangement comprising:

an electron beam deflection winding;
an electron discharge device having anode and cathode electrodes and a plurality of electrodes spaced intermediate said anode and cathode;
a transformer having a first winding coupled between said anode and cathode electrodes of the device;
means coupling said deflection winding to said first transformer winding; and
a control circuit coupled to said electrodes for causing said deflection circuit to oscillate and to generate a current having a periodically recurring sawtooth wave form in said deflection winding,
said control circuit including a resistive impedance connected between a source of direct current operating potential and a first intermediate electrode,
a second transformer winding polarized oppositely with respect to said first winding and having first and second terminals,
means coupling a first terminal of said second transformer winding to a second intermediate electrode, and
means coupling a second terminal of said second transformer winding to said resistive impedance.

7. In a television receiver, a deflection circuit arrangement comprising:

an electron beam deflection winding;
an electron discharge device having anode and cathode electrodes and a plurality of electrodes spaced intermediate said anode and cathode;
a transformer having a first winding coupled between said anode and cathode electrodes of the device;
means coupling said deflection winding to said first transformer winding; and
a control circuit coupled to said electrodes for causing said deflection circuit to oscillate and to generate a current having a recurring sawtooth waveform in said deflection winding;
said control circuit including a resistive impedance connected between a source of operating potential and a first intermediate electrode,
a second transformer winding polarized oppositely with respect to said first winding and having first and second terminals,
means coupling a first terminal of said second transformer winding to a second intermediate electrode; and
means coupling a second terminal of said second transformer winding to said resistive impedance,
said latter coupling means adapted for differentiating a voltage generated between said first intermediate electrode and cathode.

8. In a television receiver, a deflection circuit arrangement comprising:

an electron beam deflection winding;

an electron discharge device having anode and cathode electrodes and a plurality of electrodes spaced intermediate said anode and cathode;

a transformer having a first winding coupled between said anode and cathode electrodes of the device;

means coupling said deflection winding to said first transformer winding; and a control circuit coupled to said electrodes for causing said deflection circuit to oscillate and to generate a current having a periodically recurring sawtooth waveform in said deflection winding, said control circuit including a resistive impedance connected between a source of direct current operating potential and a first intermediate electrode, a second transformer winding polarized oppositely with respect to first winding and having first and second terminals, means coupling the first terminal of said second transformer winding to a second intermediate electrode; and means coupling the second terminal of said second transformer winding to said resistive impedance, said latter means including an adjustable impedance adapted for varying the frequency of oscillation.

9. In a television receiver, a deflection circuit arrangement comprising:

a vertical deflection winding adjacent a cathode ray device of the receiver and adapted to deflect an electron beam in said device when a sawtooth current flows in said winding;

a pentode electron discharge device having anode, cathode, control, screen and suppressor electrodes;

a transformer having a first winding;

means coupling said first transformer winding to said cathode and anode electrodes;

means coupling said deflection winding to said first transformer winding;

a source of direct current operating potential for said device; and a control circuit coupled to electrodes of said device for causing said deflection circuit to oscillate and to generate a current having a periodically recurring sawtooth waveform in said deflection winding;

said control circuit including a discharge circuit coupled between the anode and central electrodes of said device and adapted to establish a period of a trace interval of said sawtooth waveform, a first resistive impedance connected between said source of operating potential and said screen electrode;

a second transformer winding oppositely polarized with respect to said first winding and having first and second output terminals, means direct coupling a first terminal of said second winding current to said suppressor electrode, an adjustable resistive impedance connected to said control circuit at a point between said source of operating potential and said second terminal of said second transformer winding, and a capacitor coupled between said first resistive impedance and said adjustable resistive impedance.

References Cited by the Examiner

UNITED STATES PATENTS 3,200,289 8/1965 Kramer ------------- 315—27

DAVID G. REDINBAUGH, *Primary Examiner.*

T. A. GALLAGHER, *Assistant Examiner.*